US012674528B2

(12) United States Patent
Okano et al.

(10) Patent No.: US 12,674,528 B2
(45) Date of Patent: Jul. 7, 2026

(54) THREADED STEEL PIPE OR TUBE AND PRODUCTION METHOD THEREFOR

(71) Applicant: JFE STEEL CORPORATION, Tokyo (JP)

(72) Inventors: Hiroshi Okano, Tokyo (JP); Kazuki Matsubara, Tokyo (JP); Shusaku Takagi, Tokyo (JP); Nobuyuki Ishikawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 529 days.

(21) Appl. No.: 18/249,543

(22) PCT Filed: Nov. 2, 2021

(86) PCT No.: PCT/JP2021/040465
§ 371 (c)(1),
(2) Date: Apr. 19, 2023

(87) PCT Pub. No.: WO2022/102479
PCT Pub. Date: May 19, 2022

(65) Prior Publication Data
US 2024/0035593 A1     Feb. 1, 2024

(30) Foreign Application Priority Data
Nov. 10, 2020     (JP) ................................. 2020-187526

(51) Int. Cl.
*F16L 9/02*     (2006.01)
*B23G 1/02*     (2006.01)
*F16L 15/00*     (2006.01)

(52) U.S. Cl.
CPC .................. *F16L 9/02* (2013.01); *B23G 1/02* (2013.01); *F16L 15/006* (2013.01)

(58) Field of Classification Search
CPC ............. F16L 9/02; F16L 15/006; B23G 1/02
(Continued)

(56) References Cited

U.S. PATENT DOCUMENTS 3,751,954 A * 8/1973 Ezra ........................ B21C 37/06
29/421.2
4,550,937 A * 11/1985 Duret .................... E21B 17/042
29/434

(Continued)

FOREIGN PATENT DOCUMENTS

CN     108603636 A     9/2018
CN     111433507 A     7/2020
(Continued)

OTHER PUBLICATIONS

Apr. 5, 2024, the Extended European Search Report issued by the European Patent Office in the corresponding European Patent Application No. 21891725.0.
(Continued)

*Primary Examiner* — David R Deal
(74) *Attorney, Agent, or Firm* — KENJA IP LAW PC

(57) ABSTRACT

To alleviate stress exerted on a thread portion of a threaded steel pipe or tube during use to prevent fatigue fracture, there is provided a threaded steel pipe or tube having a female thread portion on an inner peripheral surface of at least one end, wherein a maximum value of residual compressive stress at a position of 0.4 mm in a depth direction from a thread bottom of the female thread portion is 100 MPa or more and less than or equal to tensile strength of a material of the threaded steel pipe or tube.

8 Claims, 3 Drawing Sheets

(58) Field of Classification Search
USPC ........................................................ 138/178
See application file for complete search history.

(56) References Cited

U.S. PATENT DOCUMENTS

| | | | | |
|---|---|---|---|---|
| 2019/0049069 | A1 | 2/2019 | Wada et al. | |
| 2020/0340625 | A1 | 10/2020 | Wada et al. | |
| 2021/0278043 | A1 | 9/2021 | Arashima et al. | |
| 2023/0140650 | A1* | 5/2023 | Makino | C22C 38/48 |
| | | | | 138/177 |
| 2024/0093324 | A1* | 3/2024 | Makino | C21D 7/12 |
| 2025/0012382 | A1* | 1/2025 | Sun | C22C 38/12 |

FOREIGN PATENT DOCUMENTS

| | | |
|---|---|---|
| JP | 2004052857 A | 2/2004 |
| JP | 2015158243 A | 9/2015 |
| JP | 2016089891 A | 5/2016 |
| JP | 2017141919 A | 8/2017 |
| JP | 2018009683 A | 1/2018 |
| JP | 2019044967 A | 3/2019 |
| JP | 2019082188 A | 5/2019 |
| JP | 2019113121 A | 7/2019 |
| KR | 1020190128767 A | 11/2019 |
| WO | 2018012633 A1 | 1/2018 |

OTHER PUBLICATIONS

Jan. 11, 2022, International Search Report issued in the International Patent Application No. PCT/JP2021/040465.
Nov. 8, 2022, Notification of Reasons for Refusal issued by the Japan Patent Office in the corresponding Japanese Patent Application No. 2022-515608 with English language Concise Statement of Relevance.
Feb. 27, 2025, Office Action issued by the Korean Intellectual Property Office in the corresponding Korean Patent Application No. 10-2023-7015587 with English language concise statement of relevance.
Mar. 11, 2025, Office Action issued by the China National Intellectual Property Administration in the corresponding Chinese Patent Application No. 202180074872.0 with English language search report.

* cited by examiner

THREADED STEEL PIPE OR TUBE AND PRODUCTION METHOD THEREFOR

TECHNICAL FIELD

The present disclosure relates to a threaded steel pipe or tube, and in particular to a threaded steel pipe or tube that has excellent fatigue strength in its thread portion and is suitable for use in high pressure gas containers and the like. The present disclosure also relates to a production method for the threaded steel pipe or tube.

BACKGROUND

Fuel cell vehicles, which can solve not only the $CO_2$ emission issue but also the energy issue, are expected as new vehicles in the future. Hydrogen stations for supplying hydrogen to fuel cell vehicles are equipped with high pressure gas containers (also referred to as pressure vessels) that store hydrogen at a pressure of 80 MPa or more.

There are mainly two types of shapes of such high pressure gas containers: One is a cylinder-type container with a dome part formed by drawing an end of a pipe or tube, such as a gas cylinder. The other is a straight-type container with lids on both ends of a straight pipe or tube.

The cylinder-type container has a shape in which the cross-sectional area inside the container decreases toward a gas outlet, i.e. a longitudinal end. The end is referred to as "dome part". A mouthpiece for taking gas in and out is provided at the tip of the dome part, and is sealed with a fastener having a screw. Since the area of the fastener is sufficiently small as compared with the cross-sectional area of the cylindrical part of the cylinder-type container, the stress exerted on the thread portion of the mouthpiece is reduced and therefore there is no problem with pressure sealing. However, high pressure gas containers for hydrogen stations and the like require periodic inner surface inspection after start of use, and it is difficult to perform inner surface inspection on the cylinder-type container.

In the case of producing a high pressure gas container using a metallic container, the metallic container is usually subjected to heat treatment for the purpose of strength improvement. The heat treatment typically involves quenching, i.e. a process of heating the metallic container and then rapidly cooling it using a coolant. In the case of the cylinder-type container, however, charging and discharging the coolant into and from the container takes time, so that the cooling rate in the heat treatment decreases and the steel microstructure varies greatly.

Moreover, while scale and a decarburized layer form on the surface of the metallic container due to the heat treatment, in the case of the cylinder-type container, it is difficult to remove such scale and decarburized layer formed on the container inner surface. Accordingly, the inner surface of the metallic container is used as heat treated, which causes degradation in the fatigue resistance of the metallic container.

These problems may be avoided by using the straight-type container. In a structure in which a straight pipe or tube is lidded, the opening of the pipe or tube is large, so that cooling in the heat treatment is easy and the microstructure of the steel material can be precisely controlled. In addition, a decarburized layer and scale which form during the heat treatment can be easily removed by machining. Moreover, the inner surface of the container can be easily inspected after use by removing the lid. Furthermore, since the straight-type container does not have a dome part formed by deep drawing, there is little variation caused by processing, and uniform container production is possible. Examples of such high pressure gas containers include those described in JP 2015-158243 A (PTL 1) and JP 2017-141919 A (PTL 2).

CITATION LIST

Patent Literature

PTL 1: JP 2015-158243 A
PTL 2: JP 2017-141919 A

SUMMARY

Technical Problem

In the case of using the straight-type container, all internal pressure is received by the lid because the cross section of the container is constant. The lid structure of the high pressure gas container using the straight-type container is thus required to withstand very high pressure.

Examples of the lid structure of the straight-type container include a structure in which a flange is provided at an end of the straight-type container and the lid is bolted using the flange, and a structure in which a female thread portion is provided at an end of a steel pipe or tube and a lid having a male thread portion that screws into the female thread portion is screwed to the steel pipe or tube.

However, the lid structure using the flange has the problem in that the provision of the flange causes an increase in container size and an increase in cost. To meet the demand for reduction in container size and cost, it is desirable to use the screw-type lid structure.

With the screw-type lid structure, the problem in the case of using the flange can be avoided. However, high stress applied to the thread portion can cause fatigue fracture originating from the thread portion. For longer fatigue life of the high pressure gas container, it is necessary to prevent fatigue fracture originating from the thread portion of the threaded steel pipe or tube used as the container body.

In the case of using the threaded steel pipe or tube for other than high pressure gas containers, too, it is desirable to prevent fatigue fracture originating from the thread portion in order to extend the product life.

It could therefore be helpful to alleviate stress exerted on a thread portion of a threaded steel pipe or tube during use to prevent fatigue fracture.

Solution to Problem

Upon examination, we discovered the following.
(1) When a metallic container of a high pressure gas container is filled with gas, internal pressure is exerted on the metallic container, and causes tensile stress on the metallic container. The tensile stress is concentrated in the thread portion, especially near the thread bottom.
(2) By applying specific residual compressive stress beforehand to the vicinity of the thread bottom of the threaded steel pipe or tube used as the metallic container, at least part of the tensile stress exerted on the thread portion when the metallic container is filled with gas is offset by the residual compressive stress, so that the stress actually exerted on the thread portion can be alleviated significantly. Fatigue fracture originating from the thread portion can thus be suppressed.
(3) In the case of using the threaded steel pipe or tube for other than metallic containers, too, by applying the predetermined residual compressive stress to the vicinity of the thread bottom beforehand, the stress exerted on the thread portion during use can be alleviated to thus suppress fatigue fracture.

(4) When internal pressure is applied to the threaded steel pipe or tube in a state in which a lid having a male thread portion that screws into the female thread portion of the threaded steel pipe or tube is attached thereto, stress is generated and local plastic deformation occurs in the thread bottom. Since plastic deformation occurs only in one part and most of the other regions are elastic regions, compressive stress remains in the thread bottom after the internal pressure is removed. Hence, by applying an appropriate load to the threaded steel pipe or tube in a state in which the lid is attached thereto, the predetermined residual compressive stress can be applied to the female thread portion of the threaded steel pipe or tube.

(5) Likewise, by applying the load to the threaded steel pipe or tube using a jig having a male thread portion that screws into the female thread portion of the threaded steel pipe or tube, the predetermined residual compressive stress can be applied to the female thread portion of the threaded steel pipe or tube.

The present disclosure is based on these discoveries. We thus provide the following.

1. A threaded steel pipe or tube having a female thread portion on an inner peripheral surface of at least one end, wherein a maximum value of residual compressive stress at a position of 0.4 mm in a depth direction from a thread bottom of the female thread portion is 100 MPa or more and less than or equal to tensile strength of a material of the threaded steel pipe or tube.

2. The threaded steel pipe or tube according to 1., wherein the maximum value of the residual compressive stress is less than or equal to yield stress of the material of the threaded steel pipe or tube.

3. The threaded steel pipe or tube according to 1. or 2., comprising a seamless steel pipe or tube.

4. A production method for a threaded steel pipe or tube, the production method comprising: attaching a lid having a male thread portion on an outer peripheral surface to a threaded steel pipe or tube having a female thread portion on an inner peripheral surface of at least one end so that the male thread portion is screwed into the female thread portion; and applying an internal pressure to the threaded steel pipe or tube with the lid attached thereto, under the following conditions (A), (B), and (C):

(A) thread bottom stress of the female thread portion is more than yield stress of a material of the threaded steel pipe or tube;

(B) axial stress of the threaded steel pipe or tube is less than or equal to tensile strength of the material of the threaded steel pipe or tube; and (C) circumferential stress of the threaded steel pipe or tube is less than or equal to the tensile strength of the material of the threaded steel pipe or tube.

5. A production method for a threaded steel pipe or tube, the production method comprising: attaching a jig having a male thread portion on an outer peripheral surface to a threaded steel pipe or tube having a female thread portion on an inner peripheral surface of at least one end so that the male thread portion is screwed into the female thread portion; and applying a load to the threaded steel pipe or tube using the jig, under the following conditions (A) and (B):

(A) thread bottom stress of the female thread portion is more than yield stress of a material of the threaded steel pipe or tube; and (B) axial stress of the threaded steel pipe or tube is less than or equal to tensile strength of the material of the threaded steel pipe or tube.

6. The production method for a threaded steel pipe or tube according to 4. or 5., wherein the threaded steel pipe or tube comprises a seamless steel pipe or tube.

Advantageous Effect

It is thus possible to alleviate stress exerted on a thread portion of a threaded steel pipe or tube during use to prevent fatigue fracture. Such a threaded steel pipe or tube can be used with higher pressure and larger cross section than conventional threaded steel pipe or tubes.

BRIEF DESCRIPTION OF THE DRAWINGS

In the accompanying drawings:

FIG. 1 is a schematic diagram illustrating a position where residual compressive stress is specified in the present disclosure;

FIG. 2 is a schematic diagram illustrating an example of a production method for a threaded steel pipe or tube in Embodiment 1.

DETAILED DESCRIPTION

Figure 3:
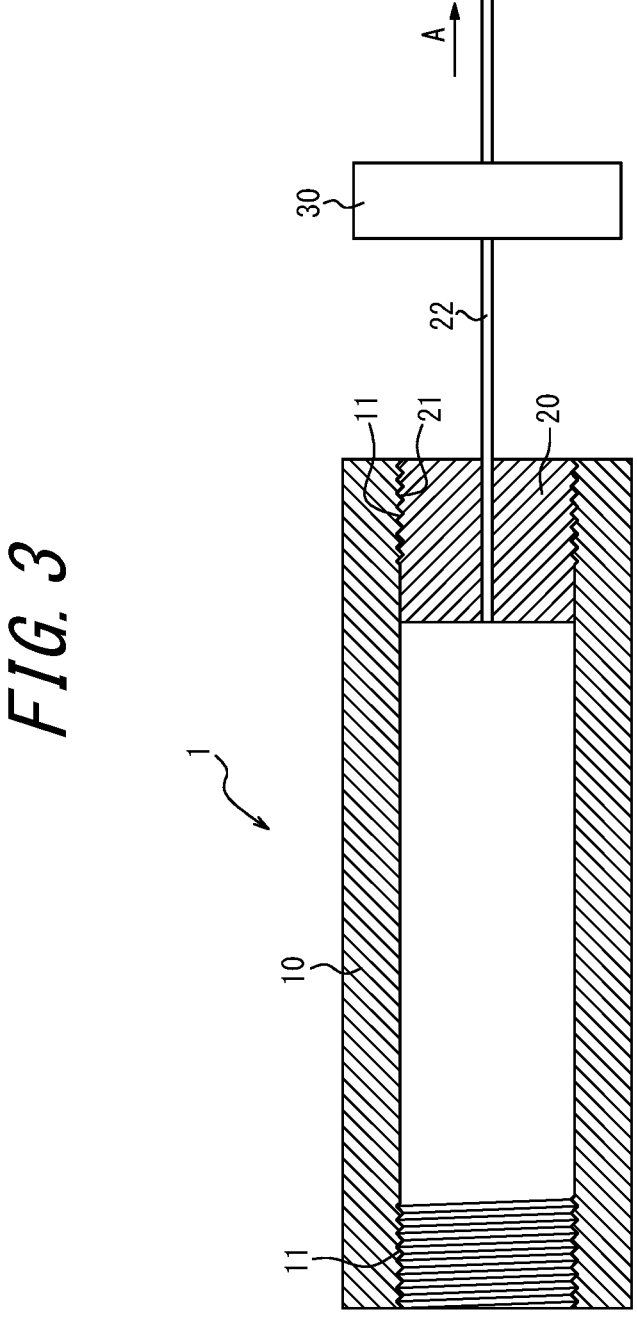
FIG. 3 is a schematic diagram illustrating an example of a production method for a threaded steel pipe or tube in Embodiment 2.

The following will describe embodiments of the present disclosure in detail. The following description shows examples of preferred embodiments of the present disclosure and does not limit the scope of the present disclosure.

[Threaded Steel Pipe or Tube]

A threaded steel pipe or tube in an embodiment of the present disclosure has a female thread portion on the inner peripheral surface of at least one end. When using the threaded steel pipe or tube, a member having a male thread portion corresponding to the female thread portion can be screwed into the threaded steel pipe or tube. For example, in the case of using the threaded steel pipe or tube as a high pressure gas container, a screw-type lid having a male thread portion can be attached to the female thread portion.

The threaded steel pipe or tube may have the female thread portion on the inner peripheral surface of only one end, or on the inner peripheral surface of both ends. In the case where the threaded steel pipe or tube has the female thread portion on the inner peripheral surface of only one end, the threaded steel pipe or tube may have a male thread portion on the inner peripheral surface of the other end.

In the present disclosure, it is important that the maximum value of residual compressive stress at a position of 0.4 mm in the depth direction from the thread bottom of the female thread portion is 100 MPa or more and less than or equal to the tensile strength of the material of the threaded steel pipe or tube. The reasons for this will be given below.

Figure 1:
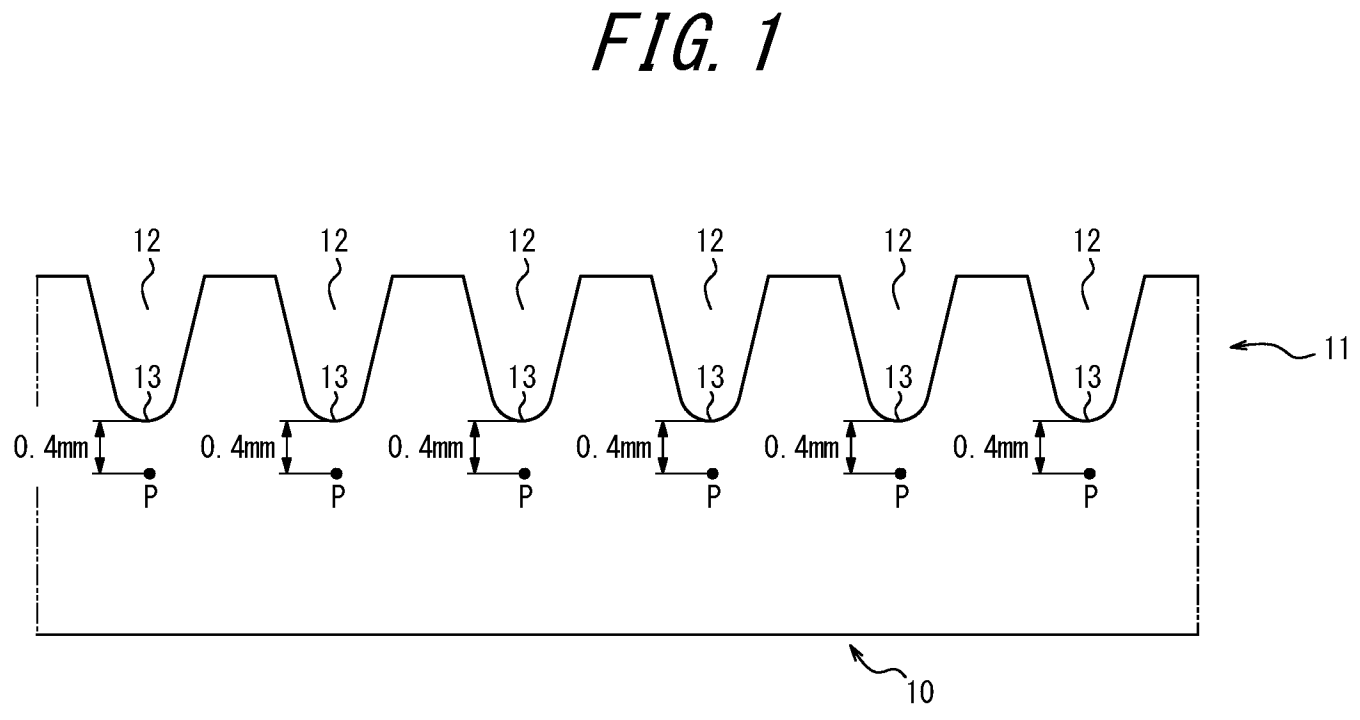

FIG. 1 is a schematic diagram illustrating a position where residual compressive stress is specified in the present disclosure. A female thread portion 11 provided on the inner peripheral surface of at least one end of a steel pipe or tube 10 has a plurality of thread grooves 12. The bottom of each thread groove 12 is a thread bottom 13 of the female thread portion. In the present disclosure, the maximum value of residual compressive stress at a position P of 0.4 mm in the depth direction from each thread bottom 13 of the female thread portion is 100 MPa or more and less than or equal to the tensile strength of the material of the threaded steel pipe or tube. FIG. 1 is merely a schematic diagram for explanation, and does not represent the actual shape and dimensions of the thread portion.

As mentioned above, when a metallic container of a high pressure gas container is filled with gas during use, internal pressure is exerted on the metallic container and causes tensile stress. The tensile stress is concentrated in the thread portion, especially near the thread bottom. By applying residual compressive stress beforehand to the vicinity of the thread bottom of the threaded steel pipe or tube, at least part of the tensile stress exerted on the thread portion when the metallic container is filled with gas is offset by the residual compressive stress, so that the stress actually exerted on the thread portion can be alleviated significantly. Fatigue fracture originating from the thread portion can thus be suppressed.

Here, the tensile stress generated during use of the high pressure gas container spreads not only on the surface of the thread portion but also inside the material. Hence, the foregoing effect cannot be achieved if the residual compressive stress exists only in the surface layer of the thread portion. Accordingly, in the present disclosure, the maximum value of residual compressive stress at a position 0.4 mm in the depth direction from the thread bottom is 100 MPa or more.

Meanwhile, if the maximum value of the residual compressive stress is excessively high, the threaded steel pipe or tube buckles and deforms. To prevent deformation of the threaded steel pipe or tube, the maximum value of the residual compressive stress is less than or equal to the tensile strength of the material of the threaded steel pipe or tube.

The maximum value of the residual compressive stress may be obtained by elasto-plastic analysis by the finite element method (FEM). Alternatively, the maximum value of the residual compressive stress may be obtained by measuring the residual stress in a cross section of the female thread portion by X-ray stress measurement.

The maximum value of the residual compressive stress is preferably less than or equal to the yield stress of the material of the threaded steel pipe or tube, from the viewpoint of more reliably preventing buckling of the thread portion.

The material of the threaded steel pipe or tube is not limited, and may be any metal. The material is preferably low-alloy steel, from the viewpoint of cost reduction. It is particularly preferable to use, as the low-alloy steel, at least one of chromium molybdenum steel (JIS SCM steel), nickel chromium molybdenum steel (JIS SNCM steel), manganese chromium steel (JIS SMnC steel), manganese steel (JIS SMn steel), ASEM SA-723, and boron-added steel N28CB, N36CB, and N46CB. Of these, chromium molybdenum steel, SA-723 steel, or nickel chromium molybdenum steel, with which quench hardenability can be easily ensured, is more preferable from the viewpoint of balancing with the material strength. For example, chromium molybdenum steel (SCM435) contains C: 0.33 mass % to 0.38 mass %, Si: 0.15 mass % to 0.35 mass %, Mn: 0.60 mass % to 0.90 mass %, P: 0.030 mass % or less, S: 0.030 mass % or less, Cr: 0.90 mass % to 1.20 mass %, and Mo: 0.15 mass % to 0.30 mass %.

As the steel pipe or tube, any steel pipe or tube such as an electric resistance welded steel pipe or tube or a seamless steel pipe or tube may be used. In particular, a seamless steel pipe or tube is preferable. Seamless steel pipes or tubes not only have excellent properties such as toughness but also have no weld portions, and thus are very suitable for use in high pressure gas containers and the like.

In the present disclosure, the depth of each thread groove is not limited. However, if the ratio of the inner diameter Di of the raw pipe or tube to the inner diameter Ds of the female thread portion, Di/Ds, is less than 0.8, the threads are excessively deep for the thickness of the steel pipe or tube (hollow piece), so that the stress exerted on the thread bottom increases. Therefore, Di/Ds is preferably 0.8 or more, from the viewpoint of further reducing the stress exerted on the thread bottom. Herein, the inner diameter Ds of the female thread portion is defined as the distance between the thread bottoms at opposite positions of the female thread portion formed on the inner peripheral surface of the steel pipe or tube. The inner diameter Di of the raw pipe or tube refers to the inner diameter of the part of the steel pipe or tube where the female thread portion is not formed.

The use of the threaded steel pipe or tube according to the present disclosure is not limited, and the threaded steel pipe or tube may be used for any purpose. Since the threaded steel pipe or tube has excellent fatigue strength in the thread portion as mentioned above, the threaded steel pipe or tube is particularly suitable for use in high pressure gas containers, joints (for example, joints for steel pipe or tube piles), and the like.

[Production Method]

A production method for a threaded steel pipe or tube in an embodiment of the present disclosure will be described below. As mentioned above, when internal pressure or load is applied to a threaded steel pipe or tube, stress is generated and local plastic deformation occurs in the thread bottom. Since plastic deformation occurs only in one part and most of the other regions are elastic regions, compressive stress remains in the thread bottom after the internal pressure or load is removed. Hence, by applying an appropriate internal pressure or load to the threaded steel pipe or tube, the predetermined residual compressive stress can be applied to the female thread portion of the threaded steel pipe or tube. The following will describe each of a production method by internal pressure application and a production method by load application in detail.

Embodiment 1

In one embodiment of the present disclosure, a threaded steel pipe or tube having the predetermined residual compressive stress can be produced by: attaching a lid having a male thread portion on the outer peripheral surface to a threaded steel pipe or tube having a female thread portion on the inner peripheral surface of at least one end (lid attachment process); and thereafter applying an internal pressure to the threaded steel pipe or tube with the lid attached thereto so as to satisfy specific conditions (internal pressure application process).

[Lid Attachment Process]

First, a lid having a male thread portion on the outer peripheral surface is attached to a threaded steel pipe or tube having a female thread portion on the inner peripheral surface of at least one end so that the male thread portion will screw into the female thread portion (lid attachment process).

Figure 2:
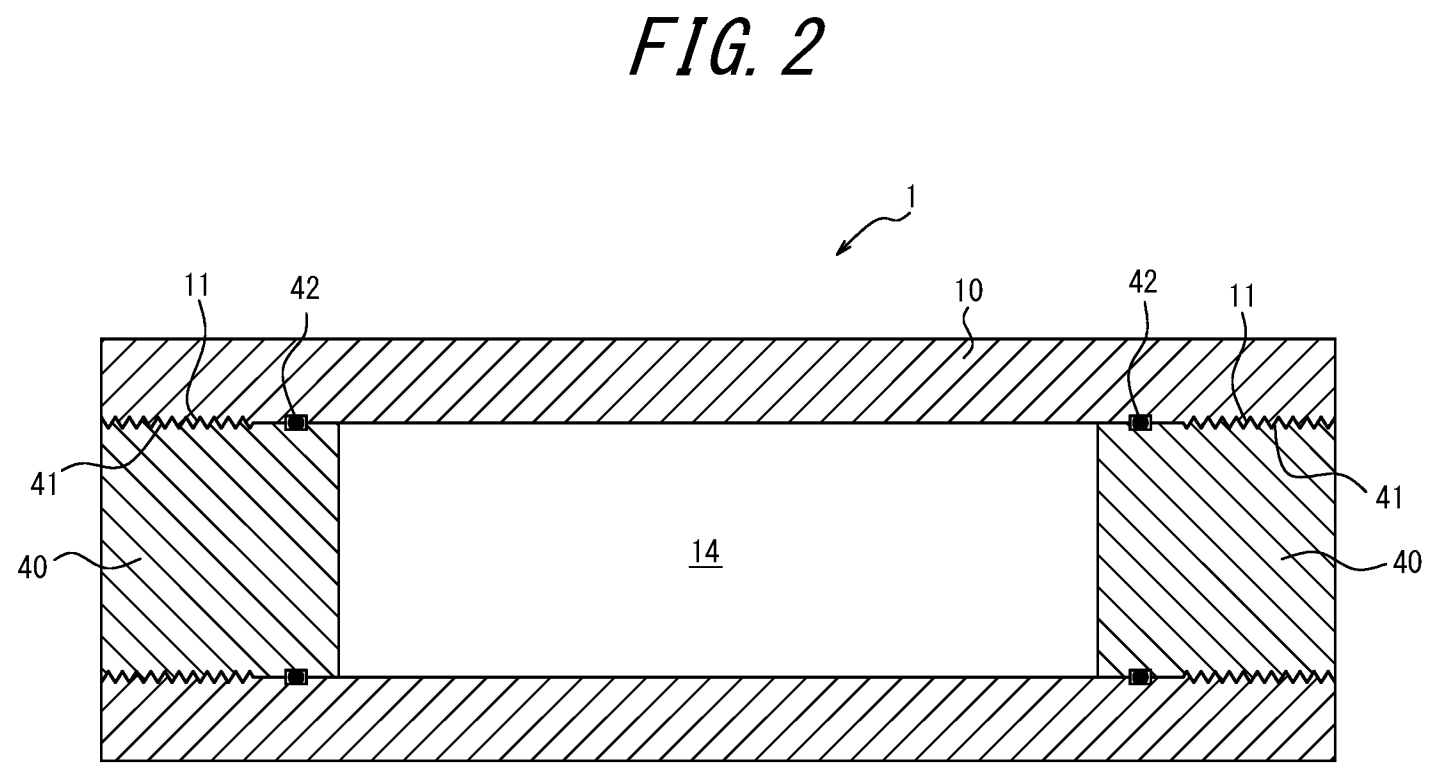

FIG. 2 is a schematic diagram illustrating an example of a production method for a threaded steel pipe or tube 1 in this embodiment. The threaded steel pipe or tube 1 is composed of a cylindrical steel pipe or tube 10, and a female thread portion 11 is provided at at least one end of the steel pipe or tube 10. In the example illustrated in FIG. 2, the female thread portion 11 is provided at both ends of the steel pipe or tube 10.

A lid 40 having a male thread portion 41 on the outer peripheral surface is then attached to the threaded steel pipe or tube 1 so that the male thread portion 41 will screw into the female thread portion 11 of the threaded steel pipe or tube 1. As illustrated in FIG. 2, the lid 40 preferably has an O-ring 42 as a sealing member on the outer peripheral surface. The male thread portion 41 is located on the container outer side of the O-ring 42 (i.e. on the side opposite to the internal space 14).

As the lid, any lid may be used as long as it can screw into the female thread portion of the threaded steel pipe or tube. In the case where the threaded steel pipe or tube has the female thread portion at both ends, the lid is attached to both ends of the threaded steel pipe or tube to enable internal pressure application.

The lid can have a through-hole for taking in and out a pressure medium used in the below-described internal pressure application process. A pipe or a valve may be optionally connected to the through-hole.

The material of the lid is not limited, but is preferably metal, and more preferably steel. As the steel, a steel material having a tensile strength (TS) of 750 MPa or more is further preferable. The steel material may be, for example, low-alloy steel. The material of the lid may be the same as the foregoing material of the steel pipe or tube. The material of the lid and the material of the steel pipe or tube may be the same or different, but are preferably the same.

[Internal Pressure Application Process]

Next, an internal pressure is applied to the threaded steel pipe or tube with the lid attached thereto (internal pressure application process). In the internal pressure application process, the internal pressure needs to be applied under the following conditions (A), (B), and (C). The reasons for this will be given below.

(A) The thread bottom stress of the female thread portion is more than the yield stress of the material of the threaded steel pipe or tube.

(B) The axial stress of the threaded steel pipe or tube is less than or equal to the tensile strength of the material of the threaded steel pipe or tube.

(C) The circumferential stress of the threaded steel pipe or tube is less than or equal to the tensile strength of the material of the threaded steel pipe or tube.

Condition (A)

To apply residual compressive stress to the vicinity of the thread bottom, it is necessary to cause plastic deformation in the thread bottom. Plastic deformation in the thread bottom can be caused by applying thread bottom stress exceeding the yield stress of the material. Therefore, in the present disclosure, the internal pressure is applied under the condition (A) in the internal pressure application process. As a result of the condition (A) being satisfied, residual compressive stress can be applied to the female thread portion.

To apply the residual compressive stress more effectively, it is preferable that the thread bottom stress applied in the internal pressure application process is more than the tensile strength of the material. In other words, it is preferable to apply the internal pressure under the following condition (A') in the internal pressure application process.

(A') The thread bottom stress of the female thread portion is more than the tensile strength of the material of the threaded steel pipe or tube.

No upper limit is placed on the thread bottom stress of the female thread portion in the internal pressure application process, and the thread bottom stress is adjusted so as to apply the desired residual compressive stress. From the viewpoint of effectively applying the residual compressive stress, the stress on the outer surface of the threaded steel pipe or tube (the outer peripheral surface of the steel pipe or tube) facing the female thread portion is preferably less than or equal to the yield stress of the material of the threaded steel pipe or tube in the internal pressure application process. By limiting the thread bottom stress to more than the yield stress and at the same time limiting the stress on the outer surface of the threaded steel pipe or tube to less than or equal to the yield stress, the residual compressive stress can be applied to the vicinity of the thread bottom more effectively than in the case where stress higher than the yield stress is applied to the threaded steel pipe or tube throughout its thickness.

Conditions (B) and (C)

As mentioned above, an internal pressure needs to be applied to cause plastic deformation, in order to apply residual compressive stress. If the internal pressure is excessive, however, the steel pipe or tube fractures. To prevent the fracture of the steel pipe or tube, both the axial stress and the circumferential stress exerted on the threaded steel pipe or tube need to be less than or equal to the tensile strength of the material of the threaded steel pipe or tube. These conditions are specifically defined in the foregoing (B) and (C).

The axial stress and the circumferential stress exerted on the threaded steel pipe or tube can be calculated according to the following formulas (1) and (2) respectively:

$$\text{Axial stress} = (\text{pressure receiving area of lid} \times \text{internal pressure}) / (\text{minimum cross-sectional area of threaded steel pipe or tube}) \tag{1}$$

$$\text{Circumferential stress} = (\text{inner diameter of threaded steel pipe or tube} \times \text{internal pressure}) / (2 \times \text{thickness of threaded steel pipe or tube}) \tag{2}$$

Herein, the "pressure-receiving area of lid" is the area of the inner surface (i.e. the surface receiving the internal pressure) of the lid. The "cross-sectional area of threaded steel pipe or tube" is the cross-sectional area of the steel part in a cross section perpendicular to the axial direction of the threaded steel pipe or tube, and does not include the cross-sectional area of the internal space of the steel pipe or tube. The cross-sectional area of the threaded steel pipe or tube may vary depending on the position in the longitudinal direction of the threaded steel pipe or tube, and the axial stress exerted on the threaded steel pipe or tube is maximum in the part where the cross-sectional area is minimum. Accordingly, the minimum cross-sectional area of the threaded steel pipe or tube is used in the formula (1).

If at least one of the axial stress and the circumferential stress exerted on the threaded steel pipe or tube is more than the yield stress of the material of the threaded steel pipe or tube, there is a possibility that the steel pipe or tube deforms plastically and the inner diameter of the steel pipe or tube changes. If the inner diameter changes, the sealability decreases when the threaded steel pipe or tube is used for a high pressure gas container or the like. Therefore, from the viewpoint of suppressing a decrease in sealability due to plastic deformation of the steel pipe or tube, the axial stress and the circumferential stress exerted on the threaded steel pipe or tube are preferably less than or equal to the yield stress of the material of the threaded steel pipe or tube, and more preferably less than or equal to 90% of the yield stress.

In other words, it is preferable to apply the internal pressure under the following conditions (B') and (C') and more preferable to apply the internal pressure under the following conditions (B") and (C") in the internal pressure application process.

(B') The axial stress of the threaded steel pipe or tube is less than or equal to the yield stress of the material of the threaded steel pipe or tube.

(C') The circumferential stress of the threaded steel pipe or tube is less than or equal to the yield stress of the material of the threaded steel pipe or tube.

(B") The axial stress of the threaded steel pipe or tube is less than or equal to 90% of the yield stress of the material of the threaded steel pipe or tube.

(C") The circumferential stress of the threaded steel pipe or tube is less than or equal to 90% of the yield stress of the material of the threaded steel pipe or tube.

To apply the internal pressure to the threaded steel pipe or tube in the internal pressure application process, the threaded steel pipe or tube is filled with any pressure medium. The pressure medium is not limited, and may be any medium. From the viewpoint of safety, an incompressible fluid such as water or oil is preferable. From the viewpoint of preventing corrosion of the threaded steel pipe or tube, an incompressible fluid containing a corrosion inhibitor or an aqueous solution of alcohol such as ethylene glycol is preferable.

Embodiment 2

In another embodiment of the present disclosure, a threaded steel pipe or tube having the predetermined residual compressive stress can be produced by: attaching a jig having a male thread portion on the outer peripheral surface to a threaded steel pipe or tube having a female thread portion on the inner peripheral surface of at least one end (jig attachment process); and thereafter applying a load to the threaded steel pipe or tube using the jig so as to satisfy predetermined conditions (load application process). This will be described in detail below, with reference to FIG. 3.

[Jig Attachment Process]

FIG. 3 is a schematic diagram illustrating an example of a production method for a threaded steel pipe or tube 1 in this embodiment, i.e. a method that applies a load using a jig. The threaded steel pipe or tube 1 is composed of a cylindrical steel pipe or tube 10, and a female thread portion 11 is provided at at least one end of the steel pipe or tube 10. In the example illustrated in FIG. 3, the female thread portion 11 is provided at both ends of the steel pipe or tube 10.

First, a jig 20 having a male thread portion 21 on the outer peripheral surface is attached to the threaded steel pipe or tube 1 so that the male thread portion 21 will screw into the female thread portion 11 of the threaded steel pipe or tube 1 (jig attachment process). As the jig 20, any jig having the male thread portion 21 that screws into the female thread portion 11 may be used.

The material of the jig is not limited, but is preferably metal, and more preferably steel. As the steel, a steel material having a tensile strength (TS) of 750 MPa or more is further preferable. The steel material may be, for example, low-alloy steel. The material of the jig may be the same as the foregoing material of the steel pipe or tube. The material of the jig and the material of the steel pipe or tube may be the same or different, but are preferably the same.

[Load Application Process]

Next, a load is applied to the threaded steel pipe or tube 1 using the attached jig 20 (load application process). The method of applying the load is not limited. For example, the load may be applied by pulling the jig 20 in the direction parallel to the axis of the threaded steel pipe or tube 1 and toward the outside of the pipe or tube (i.e. the direction of arrow A in FIG. 3) in a state in which the threaded steel pipe or tube 1 is fixed. Specifically, for example, a rod 22 attached to the jig 20 may be pulled by a load application device 30.

In the example illustrated in FIG. 3, the load is applied to the female thread portion 11 provided at one end of the threaded steel pipe or tube 1. In the case where the female thread portion 11 is provided at both ends of the threaded steel pipe or tube 1, it is preferable to apply the load to each of the female thread portions 11 at both ends. In this case, the application of the load to one female thread portion 11 and the application of the load to the other female thread portion 11 may be performed simultaneously or separately.

In the load application process, the load needs to be applied under the following conditions (A) and (B). The reasons for this will be given below.

(A) The thread bottom stress of the female thread portion is more than the yield stress of the material of the threaded steel pipe or tube.

(B) The axial stress of the threaded steel pipe or tube is less than or equal to the tensile strength of the material of the threaded steel pipe or tube.

Condition (A)

To apply residual compressive stress to the vicinity of the thread bottom, it is necessary to cause plastic deformation in the thread bottom. Plastic deformation in the thread bottom can be caused by applying thread bottom stress exceeding the yield stress of the material. Therefore, in the present disclosure, the load is applied under the condition (A) in the load application process. As a result of the condition (A) being satisfied, residual compressive stress can be applied to the female thread portion.

To apply the residual compressive stress more effectively, it is preferable that the thread bottom stress applied in the load application process is more than the tensile strength of the material. In other words, it is preferable to apply the load under the following condition (A') in the load application process.

(A') The thread bottom stress of the female thread portion is more than the tensile strength of the material of the threaded steel pipe or tube.

No upper limit is placed on the thread bottom stress of the female thread portion in the load application process, and the thread bottom stress is adjusted so as to apply the desired residual compressive stress. From the viewpoint of effectively applying the residual compressive stress, the stress on the outer surface of the threaded steel pipe or tube (the outer peripheral surface of the steel pipe or tube) facing the female thread portion is preferably less than or equal to the yield stress of the material of the threaded steel pipe or tube in the load application process. By limiting the thread bottom stress to more than the yield stress and at the same time limiting the stress on the outer surface of the threaded steel pipe or tube to less than or equal to the yield stress, the residual compressive stress can be applied to the vicinity of the thread bottom more effectively than in the case where stress higher than the yield stress is applied to the threaded steel pipe or tube throughout its thickness.

Condition (B)

As mentioned above, a load needs to be applied to cause plastic deformation, in order to apply residual compressive stress. If the load is excessive, however, the steel pipe or tube fractures. To prevent the fracture of the steel pipe or tube, the axial stress exerted on the threaded steel pipe or tube needs to be less than or equal to the tensile strength of the material of the threaded steel pipe or tube. This condition is specifically defined in the foregoing (B).

The axial stress exerted on the threaded steel pipe or tube can be calculated according to the following formula (1):

$$\text{Axial stress=load/(minimum cross-sectional area of threaded steel pipe or tube)} \quad (1).$$

Herein, the "cross-sectional area of threaded steel pipe or tube" is the cross-sectional area of the part where metal exists in a cross section perpendicular to the axial direction of the threaded steel pipe or tube. The cross-sectional area of the threaded steel pipe or tube may vary depending on the position in the longitudinal direction of the threaded steel pipe or tube, and the axial stress exerted on the threaded steel pipe or tube is maximum in the part where the cross-sectional area is minimum. Accordingly, the minimum cross-sectional area of the threaded steel pipe or tube is used in the formula (1).

If the axial stress exerted on the threaded steel pipe or tube is more than the yield stress of the material of the threaded steel pipe or tube, there is a possibility that the steel pipe or tube deforms plastically and the inner diameter of the steel pipe or tube changes. If the inner diameter changes, the sealability decreases when the threaded steel pipe or tube is used for a high pressure gas container or the like. Therefore, from the viewpoint of suppressing a decrease in sealability due to plastic deformation of the steel pipe or tube, the axial stress exerted on the threaded steel pipe or tube is preferably less than or equal to the yield stress of the material of the threaded steel pipe or tube, and more preferably less than or equal to 90% of the yield stress. In other words, it is preferable to apply the load under the following condition (B') and more preferable to apply the load under the following condition (B") in the load application process.

(B') The axial stress of the threaded steel pipe or tube is less than or equal to the yield stress of the material of the threaded steel pipe or tube.

(B") The axial stress of the threaded steel pipe or tube is less than or equal to 90% of the yield stress of the material of the threaded steel pipe or tube.

EXAMPLES

The effects according to the present disclosure will be described below by way of examples. The present disclosure is not limited to the examples described below.

Example 1

The thread bottom stress was analyzed by elasto-plastic analysis by the finite element method (FEM) using models of threaded steel pipes or tubes. Assuming the use of threaded steel pipes or tubes as high pressure gas containers, the following two types of models were used: a Type 1 container composed of a threaded steel pipe or tube made of low-alloy steel as a metallic container and having no carbon fiber reinforced resin layer; and a Type 2 container composed of a threaded steel pipe or tube (liner) made of low-alloy steel same as the Type 1 container and a carbon fiber reinforced resin layer formed by winding CFRP on the surface of the threaded steel pipe or tube so as to have a thickness of 5 mm. The threaded steel pipe or tube forming the metallic container and the lid used in the below-described internal pressure application process and performance evaluation were made of the same low-alloy steel. The tensile strength (TS) of the low-alloy steel was 821 MPa, and the yield stress (YP) of the low-alloy steel was 705 MPa. As the stress-strain curve of the low-alloy steel, the stress-strain curve of TS: 900 MPa class SNCM439 steel was used.

Regarding the dimensions of the threaded steel pipe or tube forming the metallic container, the length in the longitudinal direction was fixed at 4500 mm, the outer diameter was fixed at 404 mm, and the inner diameter and the thickness were as shown in Table 1. The lid had a structure including a disk-shaped end plate and a hollow cylindrical screw nut. The thickness of the end plate was 75 mm, and the thickness of the screw nut was 37 mm. Herein, the thickness of the screw nut is the thickness from the apex of the thread portion provided on the outer peripheral surface to the inner surface. The screw shape was a JIS trapezoidal screw with a pitch of 12 mm, a thread depth of 12 mm, and a thread shoulder curvature radius of 2.2 mm.

FEM analysis was performed with the following conditions:

Software: ABAQUS Ver. 6.12-4 (Dassault Systèmes).

Calculation model: axisymmetric model.

Mesh division: 50 μm in stress concentration part.

Boundary condition: gas pressure applied to the inner surface of the threaded steel pipe or tube and the gas storage side of the end plate.

Constraint condition: metallic cylinder: node on Y symmetry plane, Y direction displacement constraint.

End plate, screw nut: no positive node displacement fixation.

Contact condition: contact friction coefficient μ=0.05.

(Internal Pressure Application Process)

The thread bottom stress when the internal pressure shown in Table 1 was applied to the metallic container was obtained by FEM. The maximum value of the thread bottom stress in the female thread portion is shown in Table 1. The maximum value of the thread bottom stress refers to the maximum value of the stress throughout the thickness from the thread bottom to the surface on the side opposite to the thread bottom.

The axial stress and the circumferential stress of the threaded steel pipe or tube when the internal pressure was applied are also shown in Table 1. In the case where the metallic container was the Type 1 container, the axial stress and the circumferential stress were calculated according to the following formulas (1) and (2):

$$\text{Axial stress=(pressure receiving area of lid×internal pressure)/(minimum cross-sectional area of threaded steel pipe or tube)} \quad (1).$$

$$\text{Circumferential stress=(inner diameter of threaded steel pipe or tube×internal pressure)/(2×thickness of threaded steel pipe or tube)} \quad (2).$$

In the case where the metallic container was the Type 2 container, the axial stress and the circumferential stress were obtained by FEM analysis.

(Residual Compressive Stress)

Next, the residual compressive stress at a position 0.4 mm in the depth direction from the thread bottom of the female thread portion in a state in which the internal pressure was removed was obtained by FEM analysis. The maximum value of the residual compressive stress is shown in Table 2.

Next, to evaluate the performance of each threaded steel pipe or tube, the thread bottom stress when applying the internal pressure again and the thread portion fracture life were obtained.

(Thread Bottom Stress when Applying Internal Pressure)

Assuming the conditions when actually using the threaded steel pipe or tube as a high pressure gas container, the maximum value of the thread bottom stress when applying an internal pressure of 82 MPa to the threaded steel pipe or tube with the lid attached thereto was obtained by FEM analysis. The results are shown in Table 2.

(Thread Portion Fracture Life)

From the stress obtained by FEM analysis, the fracture life of the thread portion in the pressure cycle test was evaluated. The fracture life was evaluated according to the "Crack Growth Analysis Method for Various Sites" (KHKS 0220 (2010) Annex IX) stipulated by the High Pressure Gas Safety Institute of Japan. The pressure application conditions were as follows: minimum pressure: 2 MPa, maximum pressure: 82 MPa, and temperature: room temperature.

As can be understood from the results shown in Table 2, by applying internal pressure under appropriate conditions, residual compressive stress satisfying the conditions according to the present disclosure was able to be introduced into the thread bottom. In each threaded steel pipe or tube in which the maximum value of residual compressive stress at a position of 0.4 mm in the depth direction from the thread bottom satisfied the conditions according to the present disclosure, the thread bottom stress when the internal pressure was applied was reduced, and consequently excellent fatigue life was achieved.

TABLE 1

| | | Metallic container | | | | | | | | | Internal pressure application conditions | | |
| | | Metallic cylinder | | | | | | | | Maximum value | | | |
| No. | Container type | Thickness (mm) | Outer diameter (mm) | Inner diameter (mm) | Minimum thickness of female thread portion (mm) | Minimum cross-sectional area (mm²) | Lid Pressure receiving area (mm²) | Internal pressure (MPa) | of thread bottom stress of female thread portion (MPa) | Axial stress (MPa) | Circumferential stress (MPa) |
|---|---|---|---|---|---|---|---|---|---|---|---|
| 1 | Type 1 | 30 | 404 | 344 | 18 | 21828 | 92941 | 111 | 1092 | 471 | 635 |
| 2 | Type 1 | 35 | 404 | 334 | 23 | 27530 | 87616 | 133 | 1080 | 422 | 633 |
| 3 | Type 1 | 40 | 404 | 324 | 28 | 33075 | 82448 | 157 | 1108 | 390 | 634 |
| 4 | Type 1 | 45 | 404 | 314 | 33 | 38463 | 77437 | 182 | 1080 | 366 | 634 |
| 5 | Type 1 | 45 | 404 | 314 | 33 | 38463 | 77437 | 50 | 365 | 101 | 174 |
| 6 | Type 1 | 50 | 404 | 304 | 38 | 43693 | 72583 | 2 | 23 | 3 | 6 |
| 7 | Type 1 | 50 | 404 | 304 | 38 | 43693 | 72583 | 25 | 281 | 42 | 76 |
| 8 | Type 1 | 50 | 404 | 304 | 38 | 43693 | 72583 | 50 | 563 | 83 | 152 |
| 9 | Type 1 | 50 | 404 | 304 | 38 | 43693 | 72583 | 60 | 675 | 100 | 182 |
| 10 | Type 1 | 50 | 404 | 304 | 38 | 43693 | 72583 | 63 | 690 | 105 | 192 |
| 11 | Type 1 | 50 | 404 | 304 | 38 | 43693 | 72583 | 70 | 788 | 116 | 213 |
| 12 | Type 1 | 50 | 404 | 304 | 38 | 43693 | 72583 | 209 | 1100 | 347 | 635 |
| 13 | Type 2 | 55 | 404 | 294 | 43 | 48767 | 67887 | 300 | 1180 | 418 | 650 |
| 14 | Type2 | 55 | 404 | 294 | 43 | 48767 | 67887 | 380 | 1280 | 529 | 710 |
| 15 | Type 1 | 55 | 404 | 294 | 43 | 48767 | 67887 | 237 | 1080 | 330 | 634 |
| 16 | Type 1 | 55 | 404 | 294 | 43 | 48767 | 67887 | 50 | 309 | 70 | 134 |
| 17 | Type 1 | 60 | 404 | 284 | 48 | 53684 | 63347 | 268 | 1092 | 316 | 635 |
| 18 | Type 1 | 60 | 404 | 284 | 48 | 53684 | 63347 | 50 | 292 | 59 | 118 |
| 19 | Type 1 | 65 | 404 | 274 | 53 | 58443 | 58965 | 301 | 1102 | 303 | 634 |
| 20 | Type 1 | 70 | 404 | 264 | 58 | 63045 | 54739 | 337 | 1108 | 292 | 635 |
| 21 | Type 1 | 50 | 450 | 350 | 38 | 49185 | 96211 | 180 | 1132 | 352 | 630 |
| 22 | Type 1 | 50 | 425 | 325 | 38 | 46200 | 82958 | 190 | 1050 | 341 | 618 |
| 23 | Type 1 | 50 | 350 | 250 | 38 | 37247 | 49087 | 240 | 1020 | 316 | 600 |
| 24 | Type 1 | 50 | 250 | 150 | 38 | 25309 | 17671 | 350 | 850 | 244 | 525 |
| 25 | Type 1 | 80 | 350 | 190 | 68 | 60243 | 28353 | 480 | 756 | 226 | 570 |

TABLE 2

| | Test results | | | |
| No. | Maximum value of residual compressive stress at position of 0.4 mm in depth direction from thread bottom of female thread portion (MPa) | Maximum value of thread bottom stress when applying internal pressure of 82 MPa (MPa) | Thread portion fracture life (times) | Remarks |
|---|---|---|---|---|
| 1 | 435 | 698 | 256778 | Example |
| 2 | 401 | 630 | 313321 | Example |
| 3 | 346 | 572 | 296674 | Example |
| 4 | 331 | 514 | 324351 | Example |
| 5 | 0 | 803 | 126690 | Comparative Example |
| 6 | 0 | 793 | 130456 | Comparative Example |
| 7 | 0 | 793 | 130069 | Comparative Example |
| 8 | 0 | 793 | 138892 | Comparative Example |
| 9 | 15 | 793 | 131232 | Comparative Example |

TABLE 2-continued

| | Test results | | | |
|---|---|---|---|---|
| | Maximum value of residual compressive stress at position of 0.4 mm in depth direction from thread bottom of female thread portion | Maximum value of thread bottom stress when applying internal pressure of 82 MPa | Thread portion fracture life | |
| No. | (MPa) | (MPa) | (times) | Remarks |
| 10 | 53 | 700 | 150789 | Comparative Example |
| 11 | 105 | 682 | 266045 | Example |
| 12 | 345 | 456 | 623345 | Example |
| 13 | 468 | 380 | 789654 | Example |
| 14 | 780 | 310 | 1132014 | Example |
| 15 | 332 | 419 | 753212 | Example |
| 16 | 0 | 781 | 152496 | Comparative Example |
| 17 | 112 | 391 | 546672 | Example |
| 18 | 0 | 757 | 242496 | Comparative Example |
| 19 | 265 | 370 | 599012 | Example |
| 20 | 280 | 351 | 755431 | Example |
| 21 | 320 | 502 | 312355 | Example |
| 22 | 340 | 525 | 304456 | Example |
| 23 | 115 | 695 | 243318 | Example |
| 24 | 230 | 325 | 1099540 | Example |
| 25 | 215 | 280 | 1344351 | Example |

Example 2

The thread bottom stress was analyzed by elasto-plastic analysis according to the same procedure as in Example 1 except that a load was applied using a jig instead of applying an internal pressure in a lidded state. In this example, a jig having the same shape as the lid used in Example 1 was used as the jig.

(Load Application Process)

The thread bottom stress when applying the load to the metallic container using the jig was obtained by FEM. The maximum value of the thread bottom stress in the female thread portion is shown in Table 3. The load was applied by moving (displacing) the jig in the direction parallel to the pipe or tube axis and toward the outside of the pipe or tube on calculation. Here, the displacement of the jig was controlled so that the maximum value of the thread bottom stress would be the value shown in Table 3. The maximum value of the thread bottom stress refers to the maximum value of the stress throughout the thickness from the thread bottom to the surface on the side opposite to the thread bottom.

The following values were then evaluated according to the same procedures as in Example 1. The evaluation results are shown in Table 4.

Residual compressive stress at a position of 0.4 mm in the depth direction from the thread bottom of the female thread portion with the load removed.

Maximum value of thread bottom stress when applying an internal pressure of 82 MPa.

Fracture life of thread portion in pressure cycle test.

As can be understood from the results shown in Table 4, by applying a load using a jig under appropriate conditions, residual compressive stress satisfying the conditions according to the present disclosure was able to be introduced into the thread bottom. In each threaded steel pipe or tube in which the maximum value of the residual compressive stress at a position of 0.4 mm in the depth direction from the thread bottom satisfied the conditions according to the present disclosure, the thread bottom stress when the internal pressure was applied was reduced, and excellent fatigue life was achieved.

TABLE 3

| | | Metallic container | | | | | Load application conditions | |
|---|---|---|---|---|---|---|---|---|
| | | Metallic cylinder | | | | | Maximum value of | |
| No. | Container type | Thickness (mm) | Outer diameter (mm) | Inner diameter (mm) | Minimum thickness of female thread portion (mm) | Minimum cross-sectional area (mm²) | thread bottom stress of female thread portion (MPa) | Axial stress (MPa) |
| 26 | Type 1 | 30 | 404 | 344 | 18 | 21828 | 1100 | 475 |
| 27 | Type 1 | 35 | 404 | 334 | 23 | 27530 | 1100 | 440 |
| 28 | Type 1 | 40 | 404 | 324 | 28 | 33075 | 1100 | 390 |
| 29 | Type 1 | 45 | 404 | 314 | 33 | 38463 | 1100 | 366 |
| 30 | Type 1 | 45 | 404 | 314 | 33 | 38463 | 350 | 80 |
| 31 | Type 1 | 50 | 404 | 304 | 38 | 43693 | 350 | 65 |

TABLE 4

| | Test results | | | |
|---|---|---|---|---|
| No. | Maximum value of residual compressive stress at position of 0.4 mm in depth direction from thread bottom of female thread portion (MPa) | Maximum value of thread bottom stress when applying internal pressure of 82 MPa (MPa) | Thread portion fracture life (times) | Remarks |
| 26 | 440 | 702 | 245978 | Example |
| 27 | 421 | 610 | 333321 | Example |
| 28 | 346 | 572 | 296674 | Example |
| 29 | 346 | 498 | 348351 | Example |
| 30 | 0 | 793 | 116640 | Comparative Example |
| 31 | 0 | 700 | 130456 | Comparative Example |

REFERENCE SIGNS LIST 1 threaded steel pipe or tube
10 steel pipe or tube
11 female thread portion
12 thread groove
13 thread bottom of female thread portion
14 internal space
20 jig
21 male thread portion
22 rod
30 load application device
40 lid
41 male thread portion
42 O-ring
P position of 0.4 mm in depth direction from thread bottom

The invention claimed is:

1. A threaded steel pipe or tube having a female thread portion comprising a plurality of thread grooves on an inner peripheral surface of at least one end,
wherein a maximum value of residual compressive stress at a position of 0.4 mm in a depth direction from each thread bottom of the plurality of thread grooves is 100 MPa or more and less than or equal to tensile strength of a material of the threaded steel pipe or tube.

2. The threaded steel pipe or tube according to claim 1, wherein the maximum value of the residual compressive stress is less than or equal to yield stress of the material of the threaded steel pipe or tube.

3. The threaded steel pipe or tube according to claim 2, comprising a seamless steel pipe or tube.

4. The threaded steel pipe or tube according to claim 1, comprising a seamless steel pipe or tube.

5. A production method for the threaded steel pipe or tube according to claim 1, the production method comprising:
attaching a lid having a male thread portion on an outer peripheral surface to the threaded steel pipe or tube having the female thread portion on an inner peripheral surface of at least one end so that the male thread portion is screwed into the female thread portion; and
applying an internal pressure to the threaded steel pipe or tube with the lid attached thereto, under the following conditions (A), (B), and (C):
(A) thread bottom stress of the female thread portion is more than yield stress of a material of the threaded steel pipe or tube;
(B) axial stress of the threaded steel pipe or tube is less than or equal to tensile strength of the material of the threaded steel pipe or tube; and
(C) circumferential stress of the threaded steel pipe or tube is less than or equal to the tensile strength of the material of the threaded steel pipe or tube.

6. The production method for a threaded steel pipe or tube according to claim 5, wherein the threaded steel pipe or tube comprises a seamless steel pipe or tube.

7. A production method for the threaded steel pipe or tube according to claim 1, the production method comprising:
attaching a jig having a male thread portion on an outer peripheral surface to the threaded steel pipe or tube having the female thread portion on an inner peripheral surface of at least one end so that the male thread portion is screwed into the female thread portion; and
applying a load to the threaded steel pipe or tube using the jig, under the following conditions (A) and (B):
(A) thread bottom stress of the female thread portion is more than yield stress of a material of the threaded steel pipe or tube; and
(B) axial stress of the threaded steel pipe or tube is less than or equal to tensile strength of the material of the threaded steel pipe or tube.

8. The production method for a threaded steel pipe or tube according to claim 7, wherein the threaded steel pipe or tube comprises a seamless steel pipe or tube.

* * * * *